(12) United States Patent
Feng et al.

(10) Patent No.: US 8,030,390 B2
(45) Date of Patent: Oct. 4, 2011

(54) RUBBER COMPOSITION FOR DYNAMIC PARTS

(75) Inventors: Yuding Feng, Rochester Hills, MI (US); Kathy Lambrinos, London (CA); Yahya Hodjat, Oxford, MI (US)

(73) Assignee: The Gates Corporation, Denver, CO (US)

( * ) Notice: Subject to any disclaimer, the term of this patent is extended or adjusted under 35 U.S.C. 154(b) by 248 days.

(21) Appl. No.: 12/325,863

(22) Filed: Dec. 1, 2008

(65) Prior Publication Data

US 2010/0137497 A1   Jun. 3, 2010

(51) Int. Cl.
*C08K 3/34* (2006.01)
(52) U.S. Cl. ......... 524/449; 526/904; 526/901; 525/240
(58) Field of Classification Search .................. 524/449; 526/901, 904; 525/240
See application file for complete search history.

(56) References Cited

U.S. PATENT DOCUMENTS

| | | | |
|---|---|---|---|
| 4,778,852 A | 10/1988 | Futumura | |
| 4,978,714 A | 12/1990 | Bayan et al. | |
| 5,610,217 A | 3/1997 | Yarnell et al. | |
| 5,794,912 A | 8/1998 | Whittaker et al. | |
| 5,985,970 A * | 11/1999 | Chodha et al. | 524/269 |
| 6,380,312 B1 | 4/2002 | Maldonado | |
| 6,693,145 B2 | 2/2004 | Graf et al. | |
| 7,078,104 B2 | 7/2006 | Dunlap | |
| 7,166,678 B2 | 1/2007 | Dunlap et al. | |
| D549,258 S | 8/2007 | Zhu et al. | |
| 7,441,302 B2 | 10/2008 | Hiruma et al. | |
| 2008/0234080 A1 | 9/2008 | Fan et al. | |

FOREIGN PATENT DOCUMENTS

| EP | 0 543 663 A1 * | 5/1993 |
|---|---|---|
| EP | 0543663 A1 | 5/1993 |

OTHER PUBLICATIONS

Furtado, et al., "Mica as additional filler in SBR-silica compounds," European Polymer Journal, v. 36, pp. 1717-1723 (2000).
Furtado, et al., "Fatigue resistance of Mica-carbon black-styrene butadiene rubber (SBR) compounds," European Polymer Journal, v. 35, pp. 1319-1325 (1999).
Nugay, et al., "Property optimization in nitrile rubber composites via hybrid filler systems," J. Applied Polymer Science, v. 79 (2) p. 366 (2001) (abstract only).
Furtado, et al., "Evaluation of Mica-filled styrene butadiene rubber," European Polymer Journal, v. 30 (10) pp. 1151 (1994) (abstract only).
Debnath, et al., "Effect of silane coupling agent on vulcanization, network structure, polymer-filler interaction, physical properties and failure mode of mica-filled styrene-butadiene rubber," J. Materials Science, v. 22 (12) pp. 4453 (1987) (abstract only).
Debnath, et al., "Effects of silane coupling agents on mica-filled styrene-butadiene rubber," J. Applied Polymer Science, v. 37 (6) p. 1449 (2003) (abstract only).
Dow Chemical Co., "Nordel IP and Nordel MG Hydrocarbon Rubber Product Selection Guide," (Sep. 2008) (Brochure).
Harwick Standard Distribution Corporation, "Dry Ground Mica for Rubber," (Feb. 18, 2005) (Brochure).
Encyclopedia of Polymer Science and Engineering, v. 7, p. 59 (1987).

* cited by examiner

*Primary Examiner* — Robert D. Harlan
(74) *Attorney, Agent, or Firm* — P. N. Dunlap, Esq.; J. A. Thurnau, Esq.; T. A. Dougherty, Esq.

(57) ABSTRACT

A rubber composition having (A) an elastomer component in which the primary elastomer constituent is an ethylene-propylene elastomer polymerized in the gas phase with a metallocene catalyst and having a molecular weight of at least about 250,000; (B) a silicon-modified olefinic elastomer in an amount of from about 5 to about 50 parts per hundred parts of the elastomer component; (C) ground mica in an amount of from about 2.5 to about 30 parts per hundred parts of the elastomer component; and (D) a peroxide curative. The composition may be used in a vibration isolator which may be used in a belt drive system.

29 Claims, 2 Drawing Sheets

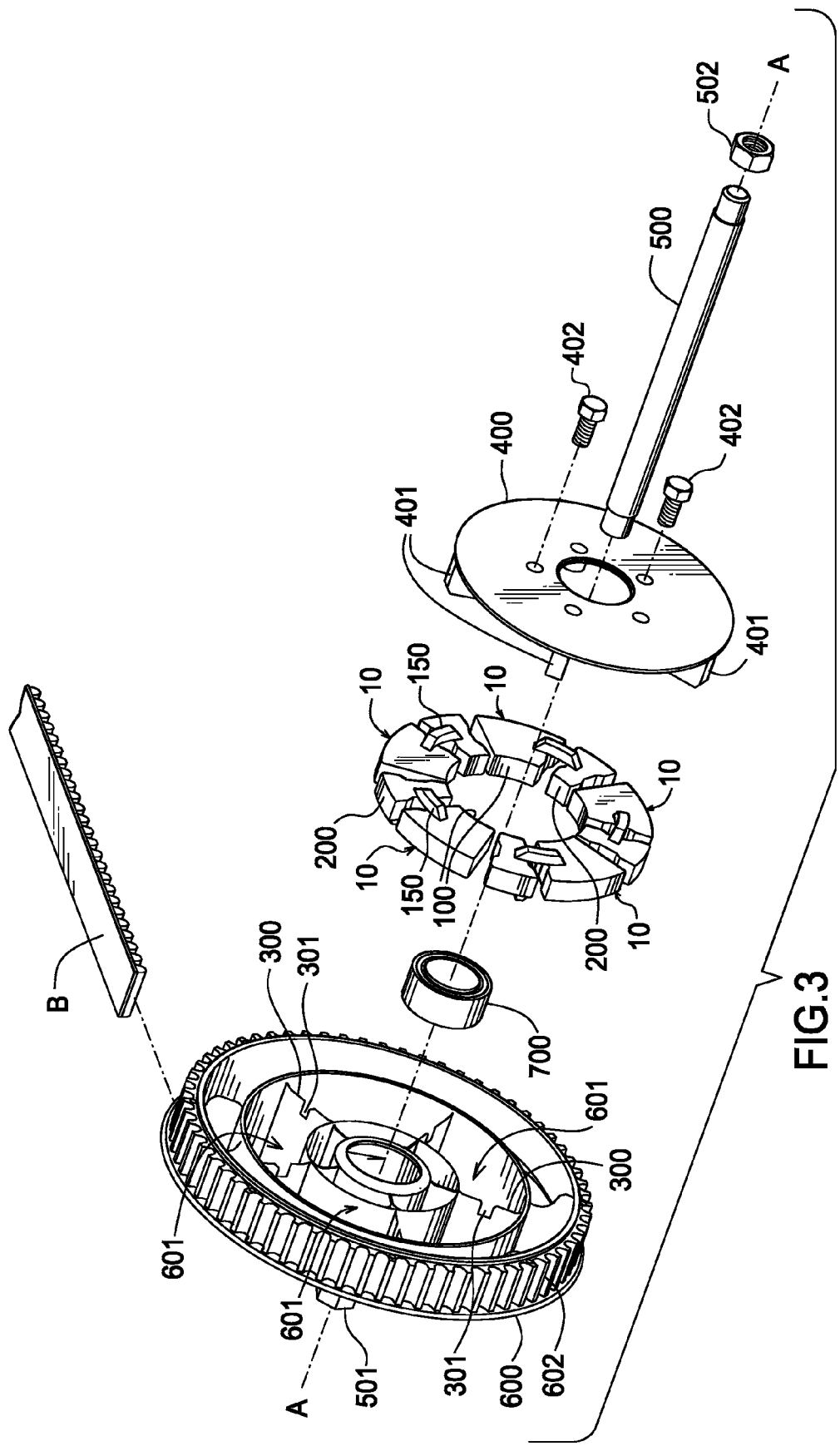

RUBBER COMPOSITION FOR DYNAMIC PARTS

CROSS REFERENCE TO RELATED APPLICATION

Reference is made to application Ser. No. 11/726,091 filed Mar. 21, 2007 and published as U.S. 2008/0234080A1, the entire contents of which are hereby incorporated herein by reference.

BACKGROUND OF THE INVENTION

1. Field of the Invention

This invention relates generally to an EPDM rubber composition for vibration isolators and such dynamic articles using the composition, more particularly to a rubber composition comprising high-molecular-weight gas-phase metallocene EPDM, ground mica, and silicone-modified EPDM.

2. Description of the Prior Art

Vibrations occur in vehicles, rotating or reciprocating machinery, and the like. Vibrations may be isolated, or absorbed or damped by appropriate placement of rubber members. The term "vibration isolation" will be used herein in its most general sense and is intended to encompass isolation, absorption, and damping of any of various modes of vibration, shock, or the like. "Vibration isolator" will be used herein for any kind of device for reducing, damping or absorbing vibration, shock, or associated noise or harshness or for isolating or preventing the transmission thereof from its source to another point in a dynamic system or to a user or observer.

Rubber for dynamic articles such as isolators and other dynamic applications of elastomers, must generally meet demanding physical requirements, such as tear strength, heat resistance, low compression set, flex fatigue, etc. Some of these properties tend to be in opposition, making improved rubber compounds difficult to achieve. For example, increased crosslink density of cured rubber generally helps reduce compression set, but also results in reduced tear strength. Natural rubber has been a preferred elastomer for isolators because of its high strength, but it is lacking in heat resistance.

Ethylene-alpha-olefin elastomers such as ethylene-propylene copolymers and ethylene-propylene-diene terpolymers ("EPDM") are general purpose synthetic elastomers known for good heat resistance, economical, easy to process, but low tear strength and poor dynamic fatigue resistance when compounded for low compression set and heat resistance, for example, by the use of peroxide cure systems. Use of EPDM in dynamic applications has been rather limited, especially for peroxide-cured EPDM. Peroxide-cured compositions suitable for belts are disclosed by U.S. Pat. No. 5,610,217. Peroxide-cured compositions suitable for rubber-metal bonded vibration isolators such as crank dampers are disclosed in U.S. Pat. Nos. 7,078,104 and 7,166,678. Sulfur-cured compositions suitable for dynamic applications as a replacement for natural rubber parts are disclosed in U.S. Pat. No. 6,693,145.

Silicone-modified EPDM is disclosed for example in U.S. Pat. No. 6,380,312 for use in oil resistant thermoplastic elastomer blends. Elastomeric blends of EPDM with silicone-modified EPDM are disclosed in U.S. Pat. No. 5,985,970 for the purpose of producing a tack-free surface on crosslinked EPDM products.

Mica is known for general use as a filler, especially in plastics, for specific use as non-conducting or insulating filler in elastomers or plastics, and for use as a dusting agent to prevent sticking of uncured rubber stocks, and the like. Mica is also known to adversely affect the fatigue life of carbon-black-filled or silica-filled elastomeric compounds.

SUMMARY

The present invention is directed to compositions which provide a rubber member suitable for use in dynamic applications in general and for vibration isolators in particular. These compositions exhibit high tear strength, low compression set, good fatigue resistance, and heat resistance, and have particularly advantageous abrasion resistance and/or frictional properties which make the inventive compositions particularly advantageous for use as vibration-isolating or vibration-absorbing rubber members in devices having a non-bonded surface or point of contact between the rubber member and a structural member. The invention is also directed to articles and systems incorporating the inventive composition or a rubber member made therefrom.

Embodiments of the invention are directed to rubber compositions having an elastomer component in which the primary elastomer constituent is an ethylene-propylene elastomer polymerized in the gas phase with a metallocene catalyst and having a molecular weight of at least about 250,000; a silicon-modified olefinic elastomer in an amount of from about 5 to about 50 parts per hundred parts of the elastomer; ground mica in an amount of from about 2.5 to about 30 parts per hundred parts of the elastomer; and a peroxide curative. The invention is also directed to the crosslinked reaction products of the foregoing composition.

In some embodiments, the olefinic elastomer may be silicone-modified ethylene-propylene elastomer. The molecular weight of the primary elastomer constituent may be in the range from about 300,000 to about 350,000. The ground mica may have a particle size such that the majority of particles pass through a number 325 mesh screen.

In other embodiments, the amount of the mica may be from about 2.5 to about 10 parts per hundred parts of the elastomer and the amount of the silicone-modified ethylene-propylene elastomer may be from about 5 to about 20 parts per hundred parts of the elastomer.

In other embodiments, the rubber composition may include one or more of the following: a minor amount of low-molecular-weight ethylene-propylene elastomer, from about 20 to about 150 parts per hundred parts of the elastomer of reinforcing filler; from about 20 to about 100 parts per hundred parts of the elastomer of process oil; and from about 1 to about 20 parts per hundred parts of the elastomer of process aid.

In certain embodiments, the inventive composition is crosslinked to form a rubber member having a cured tear strength of at least about 45 kN/m as determined by the method of ASTM D624 using die C at room temperature and/or a hardness of at least about 75 on the Shore A scale.

The invention is also directed to a dynamic article such as a vibration isolator having a structural member and a crosslinked rubber member formed from an embodiment of the inventive composition. In the dynamic article, the rubber member has a surface engaged with a surface of the structural member, but not bonded thereto, and the rubber member provides advantageous durability including abrasion resistance.

The invention is also directed to a system comprising the inventive dynamic article and a power transmission system in driving relation thereto. The power transmission system may include a toothed belt in driving engagement with the inventive isolator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
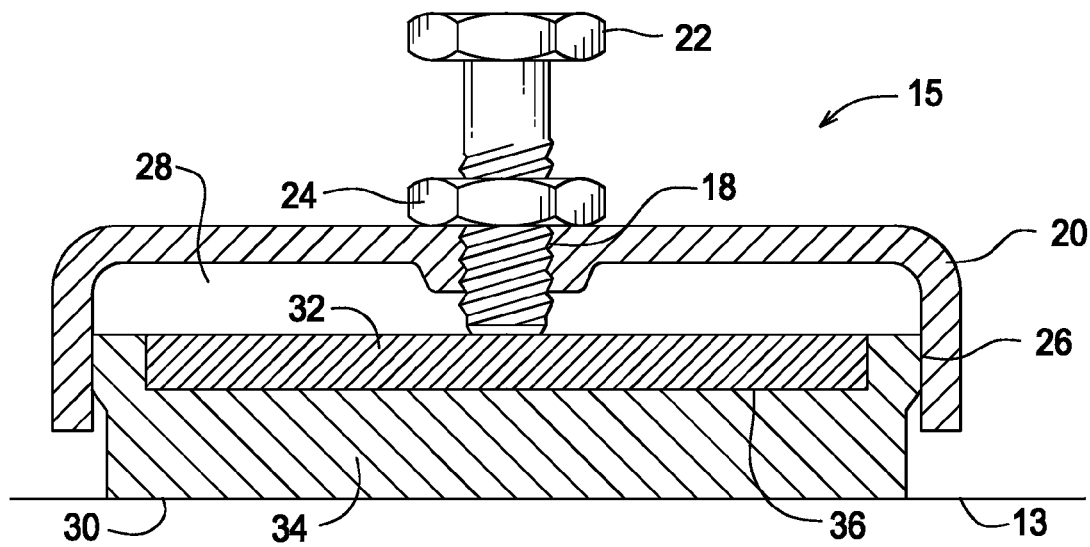
FIG. 1 is a sectional view of an anti-vibration mount according to an embodiment of the invention.

In one embodiment the invention is a rubber composition comprising an ethylene-propylene elastomer, a silicon-modified olefinic elastomer, mica, and a peroxide curative, or the crosslinked reaction product thereof. In other embodiments the rubber composition may also have one or more additional ingredients, such as reinforcing filler, process oil, and/or process aid.

The term ethylene-propylene elastomer, used herein and in the claims, includes rubbery copolymers of ethylene and propylene, optionally copolymerized with at least one polyene, usually a diene. Thus, saturated ethylene-propylene copolymer rubber, commonly called "EPM" rubber or elastomer, can be used. Examples of unsaturated ethylene-propylenediene elastomer, commonly called "EPDM" rubber or elastomer, which are satisfactory comprise the products from the polymerization of ethylene and propylene, and a lesser quantity of non-conjugated diene. Satisfactory non-conjugated dienes include straight chain dienes such as 1,4-hexadiene, cyclic dienes such as cyclooctadiene, and bridged cyclic dienes such as ethylidenenorbornene ("ENB") or vinylnorbornene.

The ethylene-propylene elastomer used as the primary elastomer constituent in embodiments of the invention is preferably polymerized in the gas phase by means of metallocene catalyst and preferably has a high molecular weight. By molecular weight is meant weight average molecular as determined by gel permeation chromatography ("GPC") for example. Preferably the molecular weight of the primary ethylene-propylene elastomer is greater than 250,000 or greater than about 300,000. The molecular weight of the primary ethylene-propylene elastomer may be in the range from about 300,000 to about 350,000. Such ethylene-propylene elastomer grades are available commercially in a granular form under the trademark NORDEL MG by The Dow Chemical Company. The granules of NORDEL MG are generally coated with carbon black. When determining the amount of elastomer present in a rubber composition, the amount of carbon black present in the NORDEL MG is generally excluded. A preferred grade is NORDEL MG 47130 which has a molecular weight of 308,000 and came with 30 PHR of carbon black in the examples reported below.

The term "primary elastomer constituent" means making up more than half of the total of the elastomeric constituents. Preferably, the primary elastomer constituent makes up 70 to 90 percent or even up to/ 100 percent of the elastomer present in the inventive composition. Additional elastomer constituents may be blended with the primary elastomer for various purposes. For example, other grades of EPM or EPDM may be blended in minor amounts for example to improve processing. A minor amount means less than half, preferably from 1 to 30 percent.

The silicon-modified olefinic elastomer component of the composition embodiments of the present invention includes olefinic elastomers which have been modified with a silicon-containing polymer. Suitable olefinic elastomers include EPM and EPDM elastomers described above, as well as others including ethylene-vinyl acetate copolymer elastomers. The silicon-containing polymer component includes various organopolysiloxanes, methoxy-stopped silicones, silanol-stopped silicones, etc. Each of the foregoing components may be manufactured by conventional techniques, and many are commercially available.

Particularly preferred silicon-modified olefinic elastomers include silicone-modified EPDM with polydimethylsiloxane polymers with either vinyl or methyl-terminated polymer chains, preferably methyl-terminated polymer chains. The vinyl content of the polydimethylsiloxane polymer may range between 0 to 4 percent, preferably between 0. 1 to 1 weight percent vinyl. The EPDM component of the silicone-modified EPDM may be 10 to 50 weight percent, preferably between 20 to 30 weight percent. Silicone-modified EPDM may be a compatibilized blend of silicone or silicon-containing polymer and EPDM. Examples of useful silicone-modified EPDM elastomers commercially available include those sold under the ROYALTHERM trademark by Lion Copolymer, LLC. The modified elastomers may also contain additives such as fillers, etc. The amount of silicon-modified olefinic elastomer may be from about 5 to about 50 parts per hundred parts of ethylene-propylene elastomer ("PHR"), or from 5 to about 20 PHR.

The mica used in the invention is a member of a group of potassium aluminum silicate minerals having a sheet or plate-like crystalline structure. Mica includes muscovite mica. The mica is preferably ground to a suitable particle size for rubber compounding. A suitable particle size of mica is −325 mesh, meaning most of the particles pass through a number 325 mesh screen. Suitable grades include 160-D Mica, 325-D Mica, 325 Mesh Mica, 325-MF Mica, and 325-FF Mica available from Harwick Standard Distribution Corporation. These grades range in screen analysis from 74% to 96% passing through a 325 mesh screen, with 1% to 6% retained on a 200 mesh screen and substantially the rest retained on the 325 mesh screen. The mica may, but need not, be treated, for example with a silane or the like for enhanced dispersion in or adhesion to the elastomer matrix. The amount of mica used may be in the range from about 2.5 to about 30 PHR, or from about 2.5 to about 15 PHR, preferably from 2.5 to about 10 PHR.

The peroxide curative may be one or more of those known in the art. Exemplary peroxide curatives include, but are not limited to, 1,1-di-(t-butylperoxy)-3,3,5-trimethylcyclohexane, 2,5-dimethyl-2,5-di-(t-butylperoxy) 3-hexyne, dicumyl peroxide, $\alpha$-$\alpha'$-bis(t-butylperoxy) diisopropyl benzene, di-t-butyl peroxide, 2,5-dimethyl-2,5-di-t-butylperoxyhexane, and t-butyl perbenzoate. Cure-effective amounts of peroxide may range from 1 to 10 PHR. It should be understood that the inventive composition may conveniently be described by the ingredients used, but then is mixed, formed, crosslinked or cured, usually by the application of heat and possibly pressure in a mold, so that a rubber article formed therefrom becomes a reaction product of those ingredients.

Reinforcing filler may be used in embodiments of the invention, including one or more carbon blacks, silicas, clays, talcs, or other non-black mineral fillers, treated or untreated, and the like. The amount of reinforcing filler may be in the range from about 20 to about 150 PHR, or from about 50 to about 100 PHR. The amount of reinforcing filler may include amounts of carbon black supplied with the ethylene-propylene elastomer, amounts of silica supplied with the silicon-modified olefinic elastomer, or amounts of fillers supplied with other ingredients.

Process oil may be used including one or more paraffinic oil, naphthenic oil, synthetic plasticizer, or the like. Paraffinic oil is preferred. Such oils may be included or supplied with an elastomer or other ingredient. The amount of process oil may be in the range from about 20 to about 100 PHR.

Process aid may be used including one or more internal and/or external lubricants, compatibilizers, dispersion aids, resins, and the like. In particular embodiments of the invention, low-molecular-weight or low-Mooney-viscosity ethylene-propylene elastomer may be used as a process aid. For example, an EPDM elastomer with Mooney viscosity in the range of from about 15 to about 30, or preferably from about 20 to about 25, may be used to improve the processing of the inventive composition. In other embodiments, process aids such as fatty acids, fatty acid derivatives, polyoctenamers, paraffin waxes, low molecular weight polyethylene and polybutene, and the like, including for example one or more process aids marketed by Struktol Company of America may be used. The amount of process aid used may be from about 1 PHR to about 20 PHR.

Other ingredients known for use in elastomer compounds may be used. For example, the composition may include one or more additional elastomers, extenders, non-reinforcing fillers, metal oxides, stearates, antioxidants, antiozonants, radical or acid scavengers, coagents, scorch retarders, cure accelerators, colorants, tackifiers, resins, compatibilizers, fire retardants, and the like.

Thus, in one preferred embodiment the invention is a rubber composition comprising 100 parts of ethylene-propylene elastomer, from about 5 to about 50 parts of silicon-modified ethylene-propylene elastomer, from about 2.5 to about 30 parts of mica, and a peroxide curative, or the crosslinked reaction products thereof.

In other preferred embodiments the rubber composition may also have one or more additional ingredients, such as from about 20 to about 150 parts of reinforcing filler, from about 20 to about 100 parts of process oil, and/or from about 1 to about 20 parts of process aid. In one embodiment, the process aid may include a low-molecular-weight ethylene-propylene elastomer, which may also be counted as part of the elastomer of the composition.

In particular for use in various vibration isolating or damping devices, embodiments of the inventive rubber composition may be advantageously compounded to have a predetermined hardness, a predetermined minimum tear strength, low compression set, and generally good physical properties. It is advantageous for cured rubber of the inventive composition to exhibit a hardness of at least about 75 or from about 75 to about 85 on the Shore A scale. It is also advantageous for cured rubber of the inventive composition to exhibit tear strength of at least about 45 kN/m when tested according to ASTM D624 using die C at room temperature. It also may be advantageous for cured rubber of the inventive composition to exhibit compression set of less than 30%, or less than 25%, when tested according to ASTM D395 Method B for 22 hours at 150° C. In addition to the aforementioned properties, cured rubber members of embodiments of the invention exhibit excellent durability under dynamic, possibly abrasive, conditions as might be found in vibration isolators. These and other advantages will be described in more detail in connection with the examples below.

According to an embodiment of the invention, FIG. 1 shows a sectional view of vertically adjustable vibration isolation mount 15, having rubber member 34 formed of a rubber composition according to an embodiment of the invention. Rubber member 34 is mounted on core 32 and preferably bonded at interface 36 between the rubber member and the core. Lower flat surface 30 is adapted to engage a supporting surface such as floor 13. Rubber member 34 and core 32 are housed in cavity 28 which is defined by frame 20, which is a structural member in this device. The dimension of cavity 28 is such as to snugly receive rubber member 34. The cavity sides engage a portion of the side surface of the rubber member at interface 26. There is no bond or adhesive between rubber member 34 and frame 20 at interface 26, so the engagement is frictional and potentially the source of wear or abrasion in use. Bolt 22 is threaded through frame 20 at hole 18 to adjust the height of the mount. Lock nut 24 allows the mount to be locked in position. The inventive rubber composition used in the rubber member insulates the frame 20 from the floor 13 and absorbs, dampens, or isolates vibrations generated by some apparatus, not shown, mounted upon frame 20. Rubber material present between the side of core 32 and frame 20 permits horizontal vibrations to be damped with excellent resistance to frictional wear at interface 26. Use of an embodiment of the inventive rubber member may also provide excellent durability at surface 30. Floor 13 may also be considered a structural member which contacts or engages a surface of the rubber member without adhesive at the interface.

Figure 2:
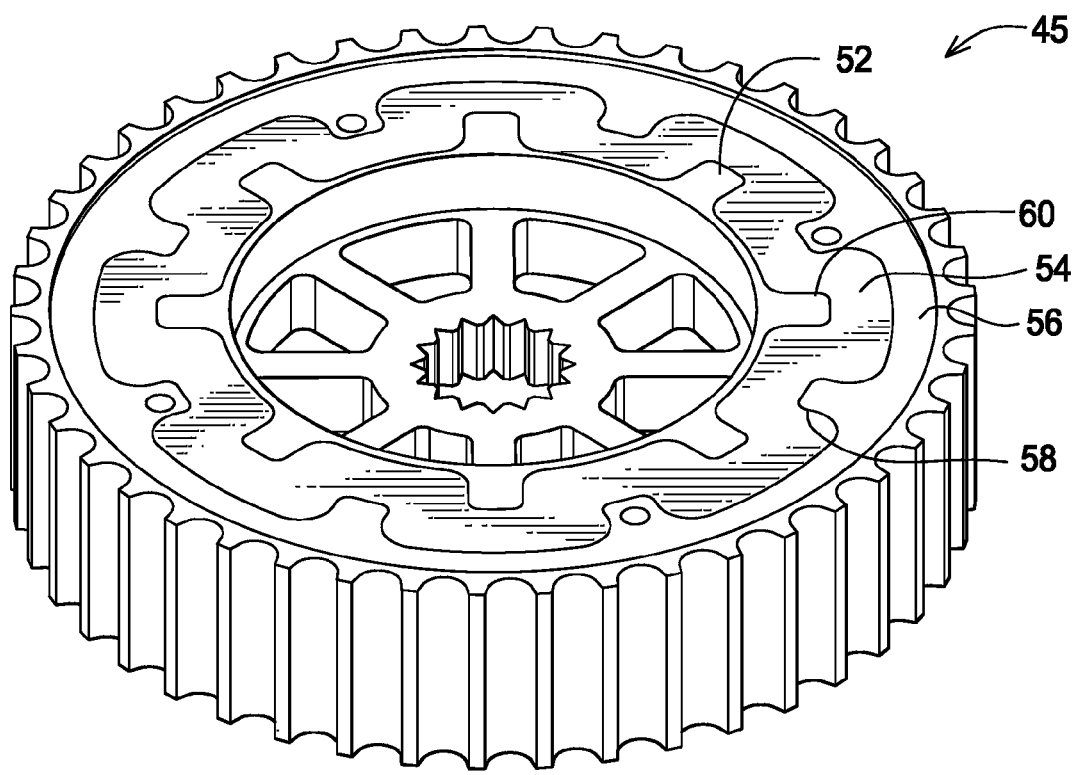
FIG. 2 is a perspective view of a vibration isolator according to an embodiment of the invention; and, FIG. 3 is an exploded view of a wheel isolator according to an embodiment of the invention.

According to another embodiment of the invention, FIG. 2 shows isolator 45 for handling torsional vibrations or shock in a belt drive system. Isolator 45 has two structural members, hub 52 and pulley ring 56 defining a shaped gap which is filled by rubber member 54. Rubber member 54 is not bonded at least one of its two contact surfaces 58 and 60 where it engages with pulley ring 56 and hub 52, respectively. Thus, at the non-bonded interface between the rubber member and a structural member, friction or wear is possible. Also, the rubber member transmits torque between the hub and the pulley ring. In a wheel isolator for a motorcycle or all terrain vehicle, commonly known as a cush drive, for example, the torques that must be transmitted are highly dynamic due to speed shifting, down shifting, engine braking, and the like.

Therefore, use of the inventive rubber composition may be advantageous to assure durability of the rubber member.

According to another embodiment of the invention, FIG. 3 shows an exploded view of a wheel sprocket isolator (or cush drive), more details of which may be found in U.S. Pat. Appl. Publ. No. 2008/0234080A1, the contents of which are incorporated herein by reference. A sprocket, such as used on a motorcycle final drive, comprises sprocket 600 which cooperatively engages wheel hub 400. Sprocket 600 comprises flat metal projecting members 300 which extend radially from axis of rotation A-A. Wheel hub 400 comprises flat metal projecting members 401 which extend radially from axis A-A.

Wheel hub 400 may be fastened to a wheel (not shown) using fasteners 402. Sprocket 600 is engaged with wheel hub 400 only by engagement of each isolating rubber member 10 and projecting members 300 and 401. Projecting members 300 and projecting members 401 interengage in an alternating manner. Receiving portions 601 are disposed within sprocket 600. Blocks 100, 200 make up rubber members 10 and occupy the receiving portions 601. Torque is transmitted from sprocket 600 to wheel hub 400 through compression of isolators 10 as each isolator bears upon projecting members 300 and projecting members 401.

Axle 500 may be connected to a motorcycle frame swing arm (not shown) in a manner known in the art using mounting nuts 501 and 502. Sprocket 600 rotates about axle 500 on sprocket bearing 700. A toothed power transmission belt B engages belt bearing surface 602. In operation torque is transmitted from the engine transmission to sprocket 600 through belt B. Belt B applies a tangential force to sprocket surface 602. The tangential force compresses blocks 100 through projecting members 300. Blocks 100 in turn press upon projecting members 401 which drive wheel hub 400. In the downshift mode torque is transmitted from the wheel to the engine through blocks 200, thereby allowing engine compression braking. There is potential for relative movement between blocks 100, 200 and projecting members 300 and 401, which may lead to abrasive wear. The stresses on the blocks are also highly dynamic. Therefore, use of the inventive rubber composition may be advantageous to assure durability of the blocks of the rubber members.

In other embodiments similar to FIG. 3, the rubber member may a chamfer, projecting members or reliefs which result in applied compressive forces causing a bending mode in a rubber member. Such a design may advantageously reduce the isolator torsional stiffness while utilizing a relatively hard and durable rubber composition, for example of Shore A hardness of 75 or more according to an embodiment of the invention.

FIG. 3 illustrates a system according to an embodiment of the invention. The system includes power transmission belt B and a dynamic article in the form of the rear wheel or wheel sprocket isolator described above. The system is an example of a cush drive system.

The examples that follow illustrate embodiments of the inventive composition and embodiments of vibration isolators using the composition.

Table 1 presents typical characteristics of the various grades of EPDM used in the following examples. BUNA is a trademark of LANXESS Deutschland GmbH. VISTALON is a trademark of Exxon Mobil Corporation. Where not readily available in supplier literature, the molecular weight ("Mw") has been estimated ("est.") based on comparing the Mooney viscosity to grades of known Mw.

Royaltherm 1411 is a silicone-modified EPDM. Royaltherm 650-LF is believed to be a silicone-modified EPDM with graphite filler suggested for use as a primary elastomer in gaskets. Royaltherm grades can be vulcanized with peroxides or sulfur/accelerator systems, provide retention of mechanical strength at elevated temperatures, weather and moisture resistance, electrical stability and compression recovery at low temperatures, and the 650-LF grade is said to offer optimum slip characteristics and freeze release in gaskets. At the levels utilized in embodiments of the present invention, the silicone-modified EPDM is believed to function primarily as a process aid and/or friction modifier, so the elastomer portion of the Royaltherm material is not included as elastomer along with the primary elastomer in the formulation, nor is it factored into the 100 parts elastomer for the PHR calculations. It should be understood that the alternative of including the EPDM portion of the Royaltherm as elastomer or in the PHR calculation is an alternative considered within the scope of the invention.

TABLE 1

| EPDM grade | Mooney Viscosity (ML1 + 4/ 125° C.) | ENB content (mass %) | Ethylene content (mass %) | Mw (g/mol) | MWD |
|---|---|---|---|---|---|
| Nordel MG 47130 | 130 | 4.9 | 67 | 308,000 | broad |
| Buna EP T6650 | 63 | 6.5 | 53 | ~200,000 est. | not known |
| Vistalon 7800 | 20 | 6 | 79 | ~130,000 est. | bimodal |
| Nordel IP 4725P | 25 | 4.9 | 70 | 135,000 | medium-narrow |

A number of compositions were prepared according to the formulations listed in Table 2. Comparative Examples (designated "Comp. Ex.") did not meet the needs of certain isolator designs such as discussed above in connection with FIGS. 2 and 3. The inventive examples (designated "Ex.") exhibit suitable properties for use in isolator designs. The compositions were mixed, according to conventional rubber practice, in an internal mixer. Test pieces for physical properties were compression molded. Rubber members for various isolator designs may be formed by any known method, such as injection molding, compression molding, or transfer molding. In some examples described below, rubber members for motorcycle rear wheel isolators were injection molded.

TABLE 2

| Ingredient (parts) | Comp. Ex. 1 | Comp. Ex. 2 | Comp. Ex. 3 | Comp. Ex. 4 | Comp. Ex. 5 | Comp. Ex. 6 | Ex. 7 | Ex. 8 | Ex. 9 |
|---|---|---|---|---|---|---|---|---|---|
| Buna EP T6650 | 50 | 40 | 50 | | | | | | |
| Vistalon 7800 | 50 | 60 | 50 | | | | | | |
| Nordel MG 47130 | | | | 130 | 117 | 117 | 117 | 117 | 117 |
| Nordel IP 4725P | | | | | 10 | 10 | 10 | 10 | 10 |

TABLE 2-continued

| Ingredient (parts) | Comp. Ex. 1 | Comp. Ex. 2 | Comp. Ex. 3 | Comp. Ex. 4 | Comp. Ex. 5 | Comp. Ex. 6 | Ex. 7 | Ex. 8 | Ex. 9 |
|---|---|---|---|---|---|---|---|---|---|
| N550 carbon black | 90 | 105 | 90 | | | | | | |
| N774 carbon black | | | | 50 | 50 | 50 | 50 | 50 | 50 |
| N990 carbon black | 10 | 15 | 10 | | | | | | |
| Silica (HiSil 243LD) | 8 | 8 | 8 | 8 | 8 | 8 | 8 | 8 | 8 |
| Paraffin Oil | 45 | 45 | 45 | 30 | 30 | 30 | 30 | 30 | 30 |
| Zinc Oxide | 10 | 10 | 5 | 5 | 5 | 5 | 5 | 5 | 5 |
| Stearic Acid | 2 | 2 | | | | | | | |
| Zinc Stearate | | | 1 | 1.5 | 1.5 | 1.5 | 1.5 | 1.5 | 1.5 |
| Antioxidant[1] | | | 1.5 | 1.5 | 1.5 | 1.5 | 1.5 | 1.5 | 1.5 |
| SP-1068[2] | | 10 | | | | | | | |
| Mica (−325 mesh) | | | | | | | 5 | 10 | 5 |
| Royaltherm 650P-LF | | | | | | | 10 | 10 | |
| Royaltherm 1411 | | | | | | | | | 10 |
| Struktol WB42[3] | | | | | 4 | 4 | 4 | 4 | 4 |
| Vestenamer 8012[4] | 2 | 2 | 2 | 2 | 2 | 2 | 2 | 2 | 2 |
| Zinc Dimethacrylate | | | | 10 | 10 | 10 | 10 | 10 | 10 |
| HVA-2[5] | | | 1 | 1 | 1 | 1 | 1 | 1 | 1 |
| Sulfur-70% active | 2 | 2 | | | | | | | |
| DPTT-75[6] | 1.77 | 1.77 | | | | | | | |
| TDEC-70[7] | 0.2 | 0.2 | | | | | | | |
| ETU-80[8] | 0.8 | 0.8 | | | | | | | |
| ZDBC-80[9] | 1.1 | 1.1 | | | | | | | |
| MBTS[10] | 1.33 | 1.33 | | | | 0.3 | 0.3 | 0.3 | 0.3 |
| SR719[11] | | | | 0.2 | 0.2 | 0.2 | 0.2 | 0.2 | 0.2 |
| Peroxide[12] | | | 4 | 7 | 7 | 7 | 7 | 7 | 7 |
| Total Parts | 274.2 | 304.2 | 267.5 | 246.2 | 247.2 | 247.5 | 262.5 | 267.5 | 262.5 |

[1]Polymerized 1,2-dihydro-2,2,4-trimethylquinoline.
[2]Tackifier resin made from octylphenol and formaldehyde from SI Group, Inc.
[3]Fatty acid derivative blend from Struktol Company of America.
[4]Polyoctenamer from Struktol Company of America.
[5]N,N' m-phenylenedimaleimide, from Sartomer Company.
[6]Dipentamethylenethiuram hexasulfide - 75% active
[7]Tellurium diethyldithiocarbamate - 70% active
[8]Ethylene thiourea - 80% active
[9]Zinc dibutyldithiocarbamate - 80% active
[10]Benzothiazyl disulfide.
[11]Scorch retarder from Sartomer Company.
[12]α-α'-bis-(t-butylperoxy-diisopropylbenzene) - 40% active on Burgess clay.

Some properties and characteristics of the example compositions are listed in Table 3. Tensile strength and elongation was tested according to ASTM D412 Method A with die-C dumbbell at room temperature. Rubber hardness was tested according to ASTM D2240 on the Shore A scale. Tear strength was tested according to ASTM D624 with die C at room temperature. Compression set was tested according to ASTM D395 Method B. Abrasion resistance was tested according to ASTM D2228, also known as the Pico test. Fatigue or crack growth of a 2-mm crack was tested according to ASTM D813 at room temperature with 2-inch stroke at 300 cycles/minute for 30,000 cycles, also known as the DeMattia test. The average crack growth rate was expressed in units of inches per million cycles. Moldability was based on injection and/or transfer molding of rubber members for an isolator like that shown in FIG. 3. The field test result was based on the performance of a rear wheel isolator, like that shown in FIG. 3, on a motorcycle.

Table 3 shows that Comp. Ex. 1-3, based on conventional grades of EPDM, exhibit insufficient tear strength, resulting in poor performance on field tests in motorcycle wheel isolators. This poor performance was observed for both sulfur and peroxide-cured rubber. On the other hand, Comp. Ex. 4, based on gas-phase metallocene-catalyzed EPDM with very high molecular weight (Nordel MG 47130), exhibit much improved tear strength, but could not be molded without non-fills and/or flow or knit lines. Comp. Ex. 5, also based on Nordel MG 47130, shows some improvement in moldability through the use of process aids such as 4 PHR of Struktol WB42 and 10 PHR of low-Mooney-viscosity EPDM (Nordel IP 4725P). Comp. Ex. 6 was finally capable of producing molded parts worth testing. Moldability in Comp. Ex. 6 was achieved by combining the process aids of Comp. Ex. 5 with MBTS, which is believed to function as a scorch retarder for the peroxide cure. The field test results for Comp. Ex. 6 showed that the improved tear strength due to the use of Nordel MG 47130 changed the failure mode from gross failure to abrasive failure along with excessive noise.

Ex. 7-9 show embodiments of the invention having as the primary elastomer Nordel MG 47130, with mica and Royaltherm added. These embodiments exhibited high tear strength, greater than 45 kN/m, and were easily moldable. They also exhibited improved abrasion resistance based on the Pico test. Ex. 9 showed excellent performance in a motorcycle isolator, with no cracks, wear, or excessive noise. On the other hand, flex fatigue is adversely affected, as indicated by the DeMattia crack growth results. However, the overall performance of the inventive compound in an isolator is apparently not adversely affected by the adverse crack growth behavior.

Rubber members for isolators similar to the embodiment of FIG. 3 were then injection molded from inventive composition Ex. 9 and subjected to additional product life testing and field testing. On various motorcycles with various wheel isolator designs, the product life was significantly increased (typically by a factor of 3 or more) over prior rubber member compositions. For example, on one motorcycle application, prior art rubber members were failing at about 5,000 km, a target life of 30,000 km was desired, and rubber members according to the embodiment of Ex. 9 were found to last 90,000 km with no visual signs of wear. On another motorcycle application, field testing of an isolator system in the drive line according to the embodiment of FIG. 3 with Ex. 9 for the rubber member resulted in a significant (approximately double) improvement in bearing life (in particular, sprocket bearing 700 shown in FIG. 3) and overall power transmission system life. At the same time, use of the inventive isolator in the drive system resulted in a significant improvement in rear tire wear, approximately doubling tire life on that motorcycle application.

The invention is also directed to a system comprising the inventive dynamic article and a power transmission system in driving relation thereto. In a preferred embodiment, the power transmission system may include a toothed belt in driving engagement with the inventive isolator. In other embodiments, the power transmission system could be a chain drive or a shaft drive or any other type of drive.

weigh this negative effect. Thus, the inventive composition provides a moldable, high tear strength, low friction, low wear, rubber member in the desired hardness range of 75 or more, suitable for use in dynamic applications such as vibration isolators.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding

TABLE 3

| Property | Comp. Ex. 1 | Comp. Ex. 2 | Comp. Ex. 3 | Comp. Ex. 4 | Comp. Ex. 5 | Comp. Ex. 6 | Ex. 7 | Ex. 8 | Ex. 9 |
|---|---|---|---|---|---|---|---|---|---|
| Tensile strength (MPa) | 13.44 | 11.38 | 15.24 | 19.23 | 17.21 | 18.02 | 17.28 | 16.89 | 17.24 |
| Elongation (%) | 303 | 289 | 345 | 324 | 325 | 312 | 298 | 330 | 319.7 |
| Hardness (Shore A) | 75 | 80 | 78 | 79 | 78 | 79 | 80 | 78 | 81 |
| Tear strength (kN/m) | 24.8 | 25.2 | 30.2 | 52.2 | 49.8 | 48.5 | 50.1 | 49.8 | 50.9 |
| Compression set (22 hrs/150° C.) (%) | 42.3 | 44.1 | 32 | 21.2 | 20.5 | 20.8 | 22.3 | 25.8 | 20.6 |
| Pico Abrasion Index | | | 83 | | | | | | 121 |
| Pico weight loss | | | 0.5% | | | | | | 0.2% |
| DeMattia average crack growth rate (in/Mcycle) | | | | | | 5.66 | 5.92 | 7.89 | 6.06 |
| Moldability[1] | OK | OK | OK | No | Poor | Fair | OK | Fair | OK |
| Field test result[2] | Tear | Tear | Tear | N.T. | N.T. | Wear | N.T. | N.T. | Pass |
| Useful Life (km) | ~5000–30,000 | | | — | — | — | ~40,000–90,000 | | |

[1]No moldability = molding was very difficult (Non-fill).
Poor moldability = molding was difficult (Flow and/or knit lines appeared).
Fair moldability = some knit lines observed.
[2]N.T. = not tested.
Tear = large cracks, compression set, gross failure.
Wear = abrasive wear, lots of rubber particles generated, and noisy.

Without intending to be limited thereby, it is believed that the inventive compositions work by a combination of mechanisms. It is believed that the isolator applications studied result in both severe stress loads and abrasive forces on a rubber member through contact with a structural member in use. Of course, there are also heat and other environmental stresses during use, which require low compression set, for example. EPDM typically meets the heat stresses without trouble, even at the levels of reinforcing filler and curative required for an 80-durometer hardness rubber compound with low compression set. However, only gas-phase metallocene ethylene-propylene elastomers are capable of also achieving very high tear strength at such filler loadings and curative levels. Even so, high molecular weight alone does not prevent abrasive wear, and processing of these high-viscosity elastomers is very difficult. It appears that the combination of mica with silicone-modified EPDM provides a noticeable reduction in coefficient of friction of the surface of the rubber element. At the same time, it appears that moldability is somewhat improved. At the same time, tear strength, compression set, and heat resistance are not affected in any negative way by mica and silicone-modified EPDM. Although flex fatigue is adversely affected, as indicated by the DeMattia results, the advantages in the application outweigh this negative effect.

embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A rubber composition comprising:
   100 parts of elastomer comprising as its primary elastomer constituent an ethylene-propylene elastomer polymerized in the gas phase with a metallocene catalyst and having a molecular weight of at least about 250,000;
   a silicon-modified olefinic elastomer in an amount of from about 5 to about 50 parts per hundred parts of the elastomer;
   ground mica in an amount of from about 2.5 to about 30 parts per hundred parts of the elastomer; and
   a peroxide curative, or the crosslinked reaction product of the foregoing.

2. The rubber composition of claim 1 wherein the olefinic elastomer is silicone-modified ethylene-propylene elastomer.

3. The rubber composition of claim 1 wherein the molecular weight is in the range from about 300,000 to about 350,000.

4. The rubber composition of claim 1 wherein the ground mica has a particle size such that the majority of particles pass through a number 325 mesh screen.

5. The rubber composition of claim 2 wherein the amount of the mica is from about 2.5 to about 10 parts per hundred parts of the elastomer and the amount of the silicone-modified ethylene-propylene elastomer is from about 5 to about 20 parts per hundred parts of the elastomer.

6. The rubber composition of claim 1 wherein the elastomer further comprises a minor amount of low-molecular-weight ethylene-propylene elastomer.

7. The rubber composition of claim 1 further comprising:
from about 20 to about 150 parts per hundred parts of the elastomer of reinforcing filler;
from about 20 to about 100 parts per hundred parts of the elastomer of process oil; and
from about 1 to about 20 parts per hundred parts of the elastomer of process aid.

8. The rubber composition of claim 1 having a cured tear strength of at least about 45 kN/m as determined by the method of ASTM D624 using die C at room temperature.

9. The rubber composition of claim 7 having a cured hardness of at least about 75 on the Shore A scale.

10. A dynamic article comprising a structural member and a crosslinked rubber member comprising the reaction product of:
100 parts of elastomer comprising as its primary elastomer constituent an ethylene-propylene elastomer polymerized in the gas phase with a metallocene catalyst and having a molecular weight of at least about 250,000;
a silicon-modified olefinic elastomer in an amount of from about 5 to about 50 parts per hundred parts of the elastomer;
ground mica in an amount of from about 2.5 to about 30 parts per hundred parts of the elastomer; and
a peroxide curative.

11. The dynamic article of claim 10 wherein the olefinic elastomer is silicone-modified ethylene-propylene elastomer.

12. The dynamic article of claim 10 wherein the ground mica has a particle size such that the majority of particles pass through a number 325 mesh screen.

13. The dynamic article of claim 10 wherein the elastomer further comprises a minor amount of low-molecular-weight ethylene-propylene elastomer.

14. The dynamic article of claim 11 wherein the molecular weight is in the range from about 300,000 to about 350,000.

15. The dynamic article of claim 14 wherein the amount of the mica is from about 2.5 to about 10 parts per hundred parts of the elastomer and the amount of the silicone-modified ethylene-propylene elastomer is from about 5 to about 20 parts per hundred parts of the elastomer.

16. The dynamic article of claim 15 further comprising:
from about 20 to about 150 parts per hundred parts of the elastomer of reinforcing filler;
from about 20 to about 100 parts per hundred parts of the elastomer of process oil; and
from about 1 to about 20 parts per hundred parts of the elastomer of process aid.

17. The dynamic article of claim 16 having a cured tear strength of at least about 45 kN/m as determined by the method of ASTM D624 using die C at room temperature.

18. The dynamic article of claim 17 having a cured hardness of at least about 75 on the Shore A scale.

19. The dynamic article of claim 10 in the form of a cush drive, vibration isolator, vibration damper, vibration absorber, or shock absorber.

20. The dynamic article of claim 10 wherein said rubber member has a surface portion in contact with, but not bonded to, a surface portion of said structural member.

21. A system comprising a dynamic article and a power transmission system in driving engagement with said dynamic article, wherein the dynamic article comprises a structural member and a crosslinked rubber member comprising the reaction product of:
100 parts of elastomer comprising as its primary elastomer constituent an ethylene-propylene elastomer polymerized in the gas phase with a metallocene catalyst and having a molecular weight of at least about 250,000;
a silicon-modified olefinic elastomer in an amount of from about 5 to about 50 parts per hundred parts of the elastomer;
ground mica in an amount of from about 2.5 to about 30 parts per hundred parts of the elastomer; and
a peroxide curative.

22. The system of claim 21 wherein the power transmission system comprises a toothed belt and the dynamic article is a vibration isolator in driving engagement with said belt.

23. The system of claim 21 in the form of a cush drive.

24. The composition of claim 1 wherein said 100 parts of elastomer consists of said primary elastomer.

25. The composition of claim 1 wherein said 100 parts of elastomer consists of from 70% to 99% said primary elastomer and from 1% to 30% low-molecular-weight ethylene-propylene elastomer.

26. The composition of claim 1 wherein said ethylene-propylene elastomer is polymerized in the gas phase in granular form and is coated with carbon black.

27. The composition of claim 26 wherein said ethylene-propylene elastomer exhibits a Mooney viscosity ML1+4 at 125° C. of at least about 130.

28. The rubber composition of claim 27 wherein the elastomer further comprises a minor amount of low-molecular-weight ethylene-propylene elastomer.

29. The composition of claim 28 wherein said molecular weight is in the range from about 300,000 to about 350,000 and said Mooney viscosity is about 130, and wherein said 100 parts of elastomer consists of from 70% to 99% said primary elastomer and from 1% to 30% low-molecular-weight ethylene-propylene elastomer having a Mooney viscosity in the range of from about 15 to about 30.

* * * * *